Sept. 9, 1958     O. L. NOTLEY     2,850,846
EGG CLEANER AND METHOD
Filed May 10, 1956     2 Sheets-Sheet 1
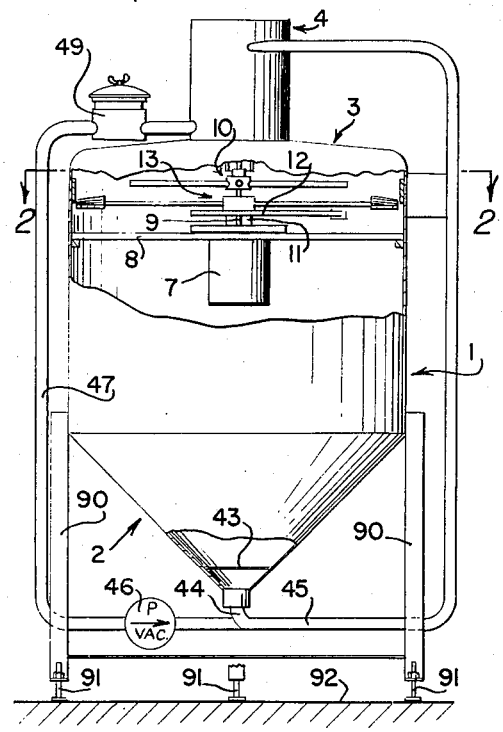
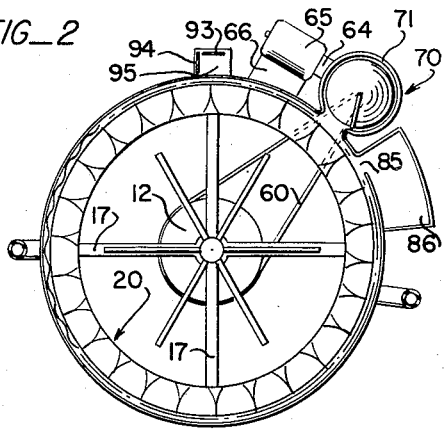
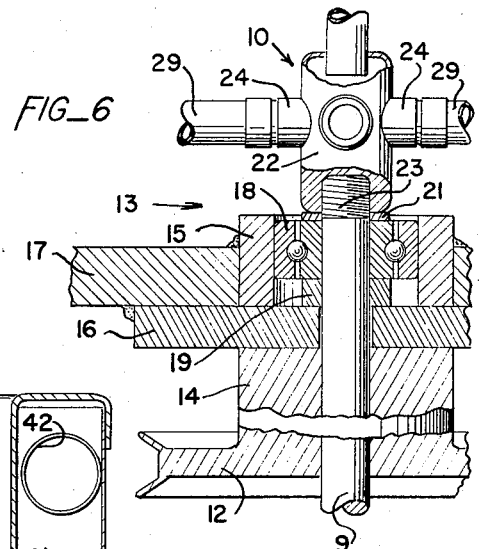
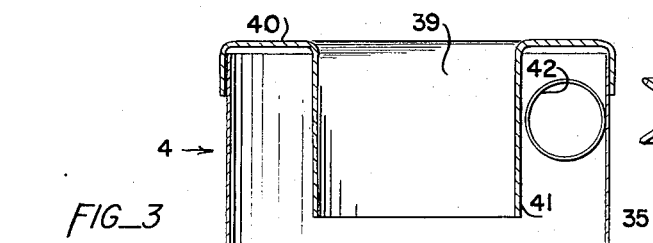
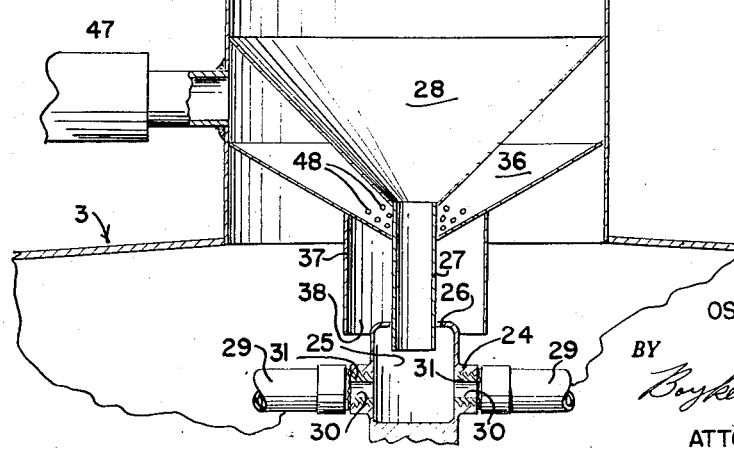
INVENTOR.
OSCAR L. NOTLEY
BY
Boyken, Mohler & Wood
ATTORNEYS Sept. 9, 1958     O. L. NOTLEY     2,850,846
EGG CLEANER AND METHOD
Filed May 10, 1956     2 Sheets-Sheet 2
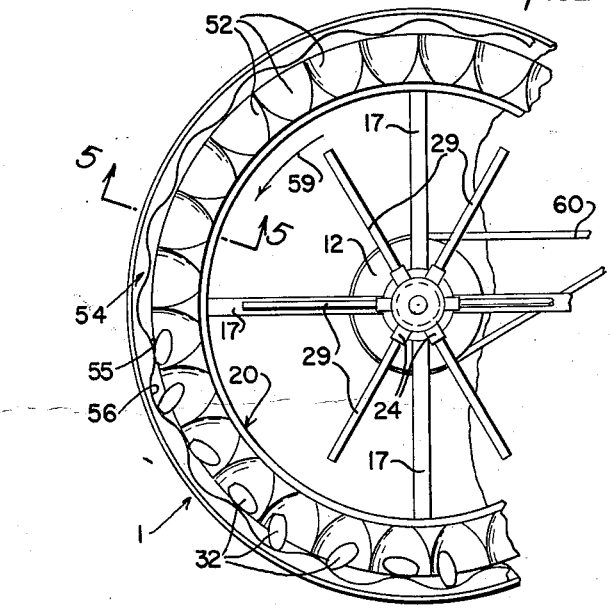
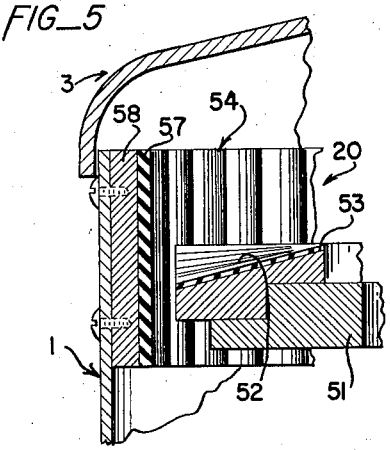
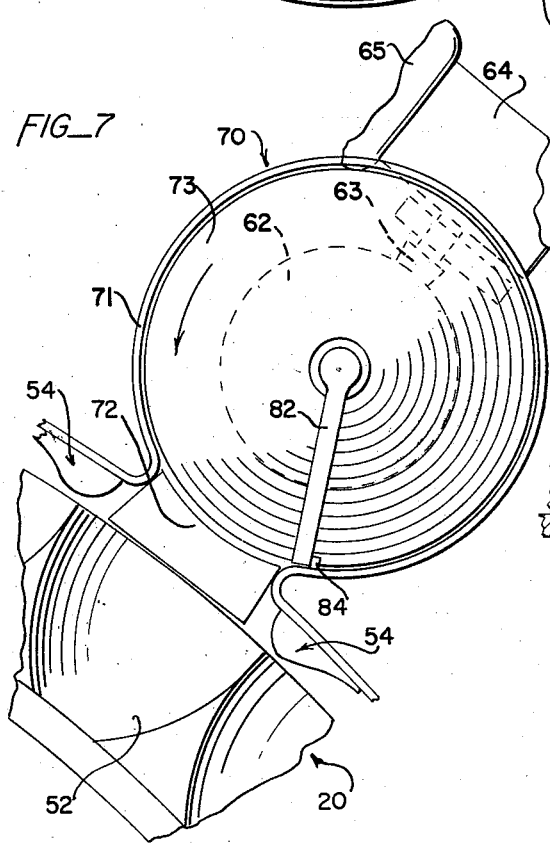
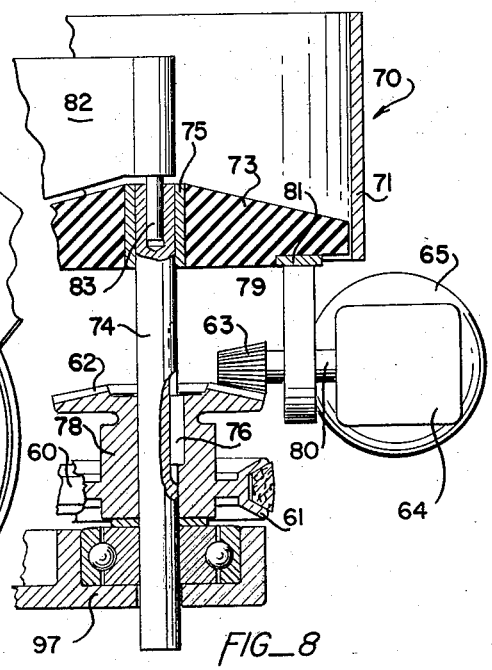
INVENTOR.
OSCAR L. NOTLEY
BY
ATTORNEYS

United States Patent Office 2,850,846
Patented Sept. 9, 1958

2,850,846

EGG CLEANER AND METHOD

Oscar L. Notley, San Francisco, Calif., assignor of one-half to Charles L. East, Healdsburg, Calif.

Application May 10, 1956, Serial No. 583,981

6 Claims. (Cl. 51—15)

This invention relates to a means and method for cleaning eggs and egg shaped objects.

One of the objects of the invention is the provision of means for quickly, safely, economically and efficiently cleaning all portions of an egg without the use of water or other liquids.

Another object of the invention is the provision of an improved method for cleaning eggs by use of a dry abrasive, and which method is safe, fast, economical, and thorough.

Heretofore different means and methods have been proposed, such as washing the eggs or using buffer wheels or wire brushes or sandpaper or tumbling the eggs together with an abrasive, but none of these various means and methods have proven satisfactory since they either injure the shells or eggs, or are too slow to be practical, or they fail to clean all portions (particularly the ends) of the eggs.

The present invention overcomes the objections and problems that have heretofore existed in the cleaning of eggs, and the eggs that are cleaned by use of the present invention are not injured nor are uncleaned areas or spots left on the eggs. The ends of the eggs as well as the sides are efficiently cleaned and polished.

Briefly described, by the present method, eggs out of contact with each other, are moved along a path of travel that is within a blast of minute abrasive particles and the eggs are rotated about their longitudinal and transverse axes during such movement and while within the influence of said blast, so that every part of the egg is cleaned, without excessive wear on any particular portion of the egg or predetermined path about each egg.

Other objects and advantages will be apparent from the detailed specification and accompanying drawings, in which:

Fig. 1 is a side elevational view of the invention partially broken away to show interior details;

Fig. 2 is a sectional view taken substantially along line 2—2 of Fig. 1;

Fig. 3 is an enlarged vertical sectional view of the sand hopper fitted to the top portion of the machine;

Fig. 4 is a fragmentary top view of the machine, showing the means for rotating the eggs;

Fig. 5 is an enlarged sectional view taken substantially along line 5—5 of Fig. 4;

Fig. 6 is an enlarged fragmentary sectional partly broken away view of the mechanism for rotating the concentrically mounted support table and sand nozzles;

Fig. 7 is an enlarged fragmentary top plan view of the egg loading device; and,

Fig. 8 is a sectional, fragmentary, partly broken away side view of the egg loading device and the means for vertically reciprocating the same.

In detail, referring to Figs. 1, 2, 3, 4, the preferred form of the invention comprises a cylindrical drum-like housing 1 fitted with a downwardly directed conical bottom member 2 and a removable top 3.

Centrally mounted atop the removable upper lid member 3 is a cylindrical abrasive storage reservoir or hopper 4 which is adapted to automatically feed an abrasive material such as sand into the machine as needed. This will subsequently be described in detail herein.

Mounted vertically along the longitudinal axis of, and within, the cylindrical housing 1 is a flanged end, sealed type motor 7 (Fig. 1) which is suspended in the said position by means of a transverse frame member 8, which member is rigidly connected at its ends to the walls of housing 1. Motor 7 is provided with an upwardly extending shaft 9, which shaft is adapted to rotate the nozzle assembly, generally designated 10, and which nozzle assembly will direct the abrasive material against the eggs.

As best seen in Figs. 1, 6, the motor shaft 9 extends through an apertured, fixed spacer block or bearing 11 atop of which is rotatably mounted a belt pulley 12 (Figs. 1, 2).

It is to be understood, however, that shaft 9, while passing through the center of pulley 12 does not drive the latter, but rather the shaft and pulley are mounted for relative rotation. The pulley 12 is rigid with a hub assembly 13 which assembly is adapted to rotatably pass the upper portion of shaft 9 (Fig. 6).

Hub assembly 13 comprises a bearing 14 integral with pulley 12, which bearing in turn is rigid with a circular spoke support plate 16 that is adapted to support the inner ends of the radially outwardly directed spokes 17 which support the rotatable annular egg carrying platform 20 at their outer ends (Figs. 2, 4). A short cylindrical member 15 on support plate 16 and coaxial with shaft 9 at the inner ends of spokes 17 is adapted to contain a ball bearing 18 which rotatably supports the upper end of the motor shaft 9 passing therethrough. The inner ends of the radial spokes 17 may be fastened to member 15 as by welding.

Bearing 18 may be spaced upwardly from the spoke support plate 16 by means of a spacer washer 19 which acts to prevent axial movement of the bearing 18 with respect to plate 16. Another similar washer element 21 may be placed above the bearing 18 so as to be interposed between the bearing and the lower surface of the hub 22 of the nozzle assembly 10.

The lower portion of hub 22 is adapted to screw-threadedly receive the upper threaded end portion 23 of shaft 9 to thereby be rotated by means of said shaft.

Hub 22 is a hollow cylinder having a plurality of radially outwardly directed centrally apertured bosses 24 equidistantly spaced about its sides. Bosses 24 are centrally apertured to communicate with a central distributing chamber 25 that is formed within and is defined by the walls of the upper portion of the cylinder 22 (Fig. 3).

The portion 26 of the hub or cylinder 22 that forms the top wall of the chamber 25 is centrally apertured to receive therethrough a downwardly directed sand carrying spout 27 which connects at its upper end with the lower central portion of the conical bottom 28 of the sand hopper 4.

As best seen in Figs. 4, 6, each boss 24 is adapted to be fitted with a radially outwardly extending substantially straight conduit or nozzle element 29. The inner ends of the nozzles may be fitted with screw type connectors to threadedly connect with the bosses 24. A relatively resilient flexible material such as rubber has been found to be most satisfactory for the nozzles 29 as it combines adequate strength with excellent abrasion resistant properties to prolong the life of the nozzles. It is not necessary to constrict the diameter of the opening at the end of the nozzle as the velocity of the particles is due to the normal acceleration of the rotating nozzles and not due to a fluid flow such as is the case with conventional sandblasting equipment.

In operation of the nozzle assembly 10 is rapidly rotated by motor 7 at a speed of approximately 1725 R. P. M. Sand which is stored in hopper 4 is fed, as by gravity, through the stationary spout 27 to the central distributing chamber 25 of hub 22. Centrifugal forces then act upon the particles of sand and cause them to pass radially outward through passages 30 formed in the threaded connectors 31 that are adapted to fasten hoses 29 to the said bosses 24. Due to the high angular velocity of the hoses or nozzles 29 the sand passing therethrough is subjected to a sudden and rapid acceleration which causes it to be forcibly thrown radially outward from the outer ends of nozzles 29 to be impinged upon the surfaces of the eggs 32 that are supported in the pockets or recesses of platform 20.

In actuality each particle of sand describes an outwardly spiraling path, and due to the plurality of nozzles 29 there is, in effect, a continuous radially outwardly moving circular sheet of sand radiating in a complete circle to thereby impinge simultaneously upon each egg 32 positioned on platform 20.

*Abrasive circulation*

With reference to Figs. 1, 3, the means for circulating the sand used for cleaning will now be described.

The sand hopper or reservoir 4 is seen to comprise an upstanding cylindrical member 35 centrally secured on the upper removable lid 3. Hopper 4 is equipped with a conical, downwardly converging bottom member 28 spaced above the lower end of member 35, which is adapted to facilitate the feeding of the sand contained therein to the downwardly directed cylindrical spout 27 integrally connected to the lower portion of said member 28. Also secured within cylinder 35 spaced below member 28 is a similar conically formed baffle 36. The lower converging portion of baffle 36 is centrally apertured to allow spout 27 to pass therethrough.

Secured to the bottom surface of the conical baffle 36 coaxial therewith is a downwardly directed open bottom cylindrical member 37 that extends downwardly to a point slightly below the upper surface 26 of the sand distributing hub 22. An annular clearance or space 38 is provided between the outside diameter of hub 22 and the inside diameter of cylinder 37 for a purpose now to be described.

To initially admit sand to hopper 4 a central opening 39 is provided in the lid member 40 which fits atop the cylindrical wall 35 of the hopper. Opening 39 is further defined by the downwardly directed cylindrical wall 41 depending from lid 40. The purpose of the inner cylindrical wall 41 is to facilitate a centrifugal cycloning effect of the sand being readmitted to the reservoir 4 through an entrance port 42, which port opens into the annular space about wall 41 generally tangentially thereof.

When the sand goes through the nozzle assembly 10, as previously described, it impinges either on an egg or on some part inside the housing 1 whereupon it falls by gravity to the bottom of the enclosure. A screening device 43 may be located near the conical bottom 2 of housing 1 if desired.

An aspirator type connection 44 is mounted at the bottom of member 2 so that the sand passing therethrough is admitted to the pressure side 45 of a vacuum or blower unit 46. Blower 46 is adapted to provide sufficient air velocity to carry the sand back up conduit 45 to redeposit it in hopper 4 by means of the tangentially intersecting entrance port 42. A whirling or cyclone effect is achieved by this tangential entrance and also by the downwardly directed portion 41 of the lid 40 of the hopper. This is desirable as it eliminates any building up of sand within the hopper and further facilitates the entrance of the sand into the distributing chamber 25 of the nozzle assembly 10.

The suction side 47 of the blower 46 is taken from the space between the conical bottom member 28 and the spaced conical baffle element 36 within the hopper (Fig. 3). As seen in Fig. 3, there are a plurality of holes 48, formed in baffle 36, which communicate with the interior of the cylindrical member 37.

This construction performs a dust separating and collecting function by creating a suction within the housing 1 where the eggs 32 are being cleaned. This suction is not strong enough to carry solid particles of sand, but the fine dust accompanying the same, and the calcium powder being abraded off from the egg shells is readily caught in the resulting draft and carried through the annular opening or space 38, through the holes 48 in baffle 36 and then into the suction conduit 47 which communicates with the space between member 28 and baffle 36 as hereinbefore stated.

A conventional dust collector 49 is interposed in the suction line 47 at some convenient location between the hopper 4 and the blower or suction pump 46 (Fig. 1).

By this construction it is seen that only clean, dust free, air enters the suction side of the vacuum pump 46 and that the solid particles of sand or abrasive material that are introduced to the pressure side 45 of the conduit at the aspirator type connection 44 are then carried to the top of hopper 4 and are once again circulated.

*Egg support*

With reference now to Figs. 4, 5, the rotating annular table 20 will now be described.

As before described, table 20 is supported for rotation in a horizontal plane by means of spokes 17 which are connected at their outer ends to the lower supporting rim 51 of wheel 20 (Fig. 5). Rim 51 may be formed as an integral part of wheel 20 if desired for reasons of manufacturing simplicity.

As best seen in Figs. 4, 5, the upper annular surface of the rotatable egg carrying table 20 is formed with a plurality of adjacent, radially outwardly and downwardly slanted, upwardly opening concave recesses 52. Recesses 52 may be formed to a radius if desired, however, they essentially need be only arcuately concavely recessed normal to a radial line extending therethrough projecting from the central hub 13.

A cushioning layer is provided on the surface of recesses 52 in the form of a soft, resilient, shock absorbing material such as the rubber 53 illustrated in Fig. 5. The purpose of the rubber facing 53 is to prevent possible injury and breakage to the egg 32 which is adapted to be contained in and rolled about the recess 52.

Disposed circumferentially about the inner cylindrical surface of housing 1, in radially spaced (for clearance) opposed relationship to the outer periphery of circular table 20 is a radially inwardly facing undulating or sinuous surface 54 comprised of a plurality of smoothly contiguous alternately inwardly and outwardly curving sections 55, 56, respectively (Fig. 4).

This undulating surface 54 may be entirely formed of a material such as rubber, or as shown in Fig. 5 may merely be a sheet of rubber-like material 57 which is bonded to a rigid backing member 58 that is formed to the desired contour.

As seen in Fig. 4, when the table 20 is slowly rotated in the direction shown by arrow 59, the eggs 32 positioned in the radially outwardly and downwardly sloping concave recesses 52 are urged, by gravity, to frictionally engage the undulating surface 54 spaced radially outward therefrom. This causes the portion of the surface of the egg 32 engaged by surface 54 to be momentarily held from movement along the path of travel of table 20; since the sides of the recesses 52 are too steep to permit the egg 32 moving from one recess to another, it is apparent that the egg is rotated about some transverse axis due to the continuing forward motion of table 20 with respect to the undulated surface 54. Furthermore due to the concavity of the recesses 52, and the fact that the egg 32 is momentarily retarded in motion and then gravity urged back into forward motion, the egg 32 also simultaneously spins or rotates about its longitudinal axis as well as a transverse axis. This means that in a complete circuit about the machine, which in this present invention is one revolution of table 20, the egg will have had all of its surface exposed at least several times to the impinging stream of abrasive particles that are being emitted from the rapidly rotating nozzles 29.

In actual operation, a rotational speed of about two revolutions per minute has been found to be very effective for the table 20 as this is not fast enough to cause impact breakage, and yet allows an hourly capacity of about 3100 eggs.

Drive for egg support

Table 20 is rotated by means of pulley 12 acting through the hereinbefore described hub mechanism 13. Pulley 12 driven by means of a belt element 60 that in turn is driven by means of an appropriately dimensional pulley element 61 which may be integral with a bevel gear 62 that is, in turn, driven by another bevel gear 63 that extends from a speed reducer element 64 attached to a small fractional horse power motor 65 (Fig. 8).

As best seen in Fig. 2 the motor 65 and attached speed reducer 64 are attached to the outer surface of housing 1 by means of mounting bracket 66. Besides being adapted to drive table 20 the motor 65 is further adapted to drive the egg infeed mechanism generally designated 70 (Figs. 2, 7, 8).

Egg feed device

As best seen in Figs. 2, 7, the infeed mechanism 70 for eggs consists of a generally circular fence 71 adjacent to and may be formed integral with a portion of the material of housing 1.

A radially inwardly opening passageway 72 is provided at the point of tangential engagement between housing 1 and the fence 71 for passage of eggs from the infeed mechanism 70. Passageway 72 is wide enough to allow an egg to roll therethrough and to be deposited, as by gravity, in a recess 52 of the wheel 20 that is passing thereby.

The infeed mechanism 70 further comprises a rotatable, frusto-conical platform 73, mounted for rotation about a central axis and for reciprocation in a vertical plane while rotating about its central axis.

To preclude breakage of the eggs the rotatable platform 73 is preferably made of a soft shock absorbing material such as rubber or the like.

Centrally mounted, and coterminous with the upper surface of platform 73 is a vertically extending shaft member 74 connected with platform 73 as by means of a bushing 75 interposed therebetween.

Shaft 74 is connected by a spline 76 with the hub portion 78 of the bevel gear 62.

It is understood that gear 62 remains in a fixed vertical relationship with respect to the mounting bracket 97 that is rigidly secured to the housing 1. Shaft 74 is freely slidable axially with respect to said hub on gear 62 so that it is evident that shaft 74, and consequently platform 73, may be simultaneously rotated and reciprocated.

The means of reciprocating platform 73 may be an eccentrically mounted, freely rotatable roller element or cam 79 that is mounted for rotation therewith to shaft 80 extending out from the speed reducer 64. Shaft 80 is also adapted to carry the small driving bevel gear 63 hereinbefore referred to. Inasmuch as the material of platform 73, against the underside of which cam 79 acts, is relatively soft and pliable, it is desirable to insert a tire element 81 for the cam 79 to engage.

The rotation and reciprocation of platform 73 is so synchronized with the rotation of the table 20 that when an egg receiving recess 52 is opposed to the passageway 72 (Fig. 7) the rotatable platform 73 will be at the top of its reciprocatory stroke, and an egg resting on top of the platform will roll by gravity through the passageway 72 and into the slowly passing recess 52. The period of time during which the platform 73 is at the upper part of its stroke is short enough to allow only one egg to be deposited at a time in each recess 52. The rotation of platform 73, in a counterclockwise direction as viewed in Fig. 7 provides means for urging the eggs deposited within the circular fence of the infeed mechanism 70 to a position where they may readily pass through passageway 72 when platform 73 arises upwardly. When the platform is at the lower end of its stroke, the housing wall prevents eggs from rolling off platform 73.

Preferably the lower edge of the platform 73 is slightly higher than the bottom of each recess 52 when the platform is at the upper end of its stroke to prevent the egg rolling into the recess from being blown back onto platform 73 by the effect of the sand blast, and while a small amount of sand may be blown through the egg inlet and outlet openings, such small amount of said sand may be deflected by any suitable baffle or curtain to fall by gravity. Dust will be sucked out of the housing by the pump 46.

To prevent the possibility that the eggs will just merely rotate around in a complete circle with platform 73 a deflector member 82 directed radially outward from the axis of rotation of platform 73 toward the inner surface of fence 71 adjacent the passageway 72 is pivotally mounted as at 83 (Fig. 8) to the central portion of the upper end of shaft 74. By imposing a restraining member, such as block 84 (Fig. 7) against which the outer end of fence 82 must bear said fence is prevented from rotation with platform 73 but yet allowed to reciprocate with the same. Fence 82 then acts as a guiding surface to facilitate the eggs entering and passing therethrough passageway 72.

Outlet for cleaned eggs

After an egg 32 has been introduced to the machine through the infeed mechanism 70 and passageway 72 and has gone through the complete cycle of operation on table 20, it is automatically unloaded from the machine by providing a discontinuity 85 in housing 1 (Fig. 2) through which the egg may roll, due to gravity, into an outlet trough 86 whereupon it may be retrieved by the operator of the machine or placed upon an awaiting conveyor mechanism (not shown) to thereupon pass to some further processing station. Due to the outward and downward slope of the recesses 52 the egg 32 contained therein will automatically be gravity urged to pass through outlet 85.

In order to keep the time at an absolute minimum that any one recess 52 is unloaded, it is desirable that the outlet 85 be positioned as close to the inlet passageway 72 as is practicable. As seen in Fig. 2 when a recess 52 discharges its egg through the outlet 85 it need only move through a distance equivalent to its own width before it receives a new, uncleaned egg from the infeed mechanism 70. So in effect every recess 52 of the platform 20 is always loaded and optimum efficiency results.

Since gravitational forces are utilized to advantage in this present invention it is a necessary requirement that when in use the present invention be oriented so as to best take advantage of them. Inasmuch as the design of the machine is essentially symmetric about its vertical longitudinal axis, it is preferred that the machine be installed in a level position. To accommodate this each support leg 90 (Fig. 1) is equipped with a screwthreadedly adjustable foot 91 each of which may be correctly adjusted for length to compensate for any irregularities in the surface of the floor 92. To further enable the operator to determine if the machine is level a pair of horizontal spirit levels 93, 94, placed at right angles to each other may be provided attached to some convenient location on the machine such as the support plate 95 shown.

The use of rubber in the recesses 52 and for the liner 57, a rubber-like material, provides egg engaging surfaces of antifriction characteristics to insure the rotation of the eggs about their longitudinal and transverse axes. This is quite important, since there should be a minimum slippage of the eggs, and the surfaces described virtually eliminate such slippage.

Also the use of the rubber or rubber-like material provides a water or moisture proof egg support and liner 57 around the table 20 that will not absorb moisture, and should a cracked egg inadvertently pass an inspector and be delivered to table 20, the latter can be readily cleaned and there would be no noticeable reduction in the efficiency of the claims in the event of such accidental breakage of defective eggs since the material would be quickly absorbed and dissipated in the system.

A substantial portion of the sand striking the material 57 will be deflected against the sides of the eggs that face generally away from the axis of rotation of the sand blast nozzles, and this will help to clean the eggs. Since the material 57 has a sinuous or undulating surface, the deflection of the sand against the eggs is more effective than were the material 57 merely a flat truly circular band.

*Method*

By the above described apparatus, it is seen that the steps in the method of cleaning eggs comprises supporting the eggs for movement along a path of travel, and so moving them, and at the same time presenting all of their outer surfaces to a blast of sand for removing foreign material therefrom. The presenting of their surfaces to the sand blast (the word "sand blast" being intended to include a blast of sand or any suitable particulate abrasive material) includes causing the eggs to rotate about constantly changing axes relative to the direction of the blast during said movement in said path, and by the apparatus disclosed, the eggs are caused to bodily move up and down and horizontal during their rotation, while the direction of the blast remains substantially the same. Both gravity and the sand blast maintains the eggs in a predetermined path that is sinuous about a generally vertical axis and in a horizontal plane, due to the undulations in the band that extends around the path and that defines the path of movement of the eggs.

The specific or detailed description is not intended to be restrictive of the invention, but is merely descriptive of the preferred form.

I claim:

1. An egg cleaner comprising, egg supporting means for supporting a plurality of eggs in spaced relation in a horizontally disposed circular row for rotation of said means about a vertical axis, support moving means connected with said egg supporting means for rotating the latter in one direction about a vertical axis, said egg supporting means including a circular row of upwardly and radially outwardly opening recesses each adapted to support an egg therein with the major portion of each egg projecting above said recess, the lower side of each recess being slanted downwardly in direction away from said axis whereby an egg in each recess will tend to roll out of the radially outwardly opening side of each recess, egg engaging means concentric with said row and spaced outwardly of said egg supporting means positioned engaging the eggs in said recesses and for holding them in the latter during movement of said egg supporting means about said axis whereby eggs in said recesses will be caused to rotate about axes extending through said eggs upon movement of said egg supporting means about said axis, and means spaced radially inwardly of said row for directing a blast of particulate abrasive material outwardly against eggs held in said recesses for cleaning said eggs.

2. An egg cleaner comprising, egg supporting means for supporting a plurality of eggs in spaced relation in a horizontally disposed circular row for rotation of said means about a vertical axis, support moving means connected with said egg supporting means for rotating the latter in one direction about a vertical axis, said egg supporting means including a circular row of upwardly and radially outwardly opening recesses each adapted to support an egg therein with the major portion of each egg projecting above said recess, the lower side of each recess being slanted downwardly in direction away from said axis whereby an egg in each recess will tend to roll out of the radially outwardly opening side of each recess, egg engaging means concentric with said row and spaced outwardly of said egg supporting means positioned engaging the eggs in said recesses and for holding them in the latter during movement of said egg supporting means about said axis whereby eggs in said recesses will be caused to rotate about axes extending through said eggs upon movement of said egg supporting means about said axis, and means spaced radially inwardly of said row for directing a blast of particulate abrasive material outwardly against eggs held in said recesses for cleaning said eggs, said egg supporting means having a substantially sinuously extending surface in direction circumferentially of said row of recesses whereby eggs engaged by said sinuously extending surface will be bodily tilted to different angles relative to vertical as said eggs supporting means carries said eggs about said axis.

3. An egg cleaner comprising: a substantially horizontal support formed with a row of upwardly opening recesses that also open laterally outwardly of one and the same side of said support and row, each of said recesses being relatively shallow for supporting an egg therein with the major portion of each such egg projecting above each recess, an annular member spaced from said one side of said support and extending across the latter open sides of said recesses, means supporting said annular member stationary relative to said support and in a position for engaging a side of each egg in each of said recesses, means mounting said support for movement in one direction longitudinally of said row, means connected with said support for so moving the latter and sand blast means at the side of said support opposite to the lateral open sides of said recesses for directing a blast of particulate abrasive material over said support and against the eggs adapted to be carried in said recesses during movement of said support in said one direction.

4. An egg cleaner comprising: a circular row of egg supports each having a bottom inclined downwardly and outwardly relative to the central axis of said row and the bottom of each support being curved in a direction transversely of a radial line extending from said axis whereby an egg on said bottom will roll by gravity to the lower end thereof, a generally annular member coaxial with the axis of said row spaced outwardly of and around said row, means connected with said member for supporting it stationary in a position for engaging the eggs on the bottoms of said supports for holding them on said bottoms, said member having a circumferentially extending sinuous radially inwardly facing surface adapted to be engaged by said eggs, means connected with said supports supporting them for movement in one direction about said axis whereby eggs on said bottom will be rotated about substantially constantly changing axes through their frictional engagement with said sinuous surface on said generally annular member, as said eggs are carried by said supports, and a plurality of radially outwardly directed and radially outwardly extending nozzles extending outwardly of said axis and in the plane of eggs adapted to be supported on said supports for discharging particulate abrasive material against said eggs as the latter are rotated and moved about said axis, rotary means on said axis connected with the radially inner ends of said nozzles for delivering particulate abrasive material thereto for discharge therefrom.

5. An egg cleaner comprising: a circular row of egg supports each having a bottom inclined downwardly and outwardly relative to the central axis of said row and the bottom of each support being curved in a direction transversely of a radial line extending from said axis whereby an egg on said bottom will roll by gravity to the lower end thereof, a generally annular member coaxial with the axis of said row spaced outwardly of and around said row, means connected with said member for supporting it stationary in a position for engaging the eggs on the bottoms of said supports for holding them on said bottoms, said member having a circumferentially extending sinuous radially inwardly facing surface adapted to be engaged by said eggs, means connected with said supports supporting them for movement in one direction about said axis whereby eggs on said bottom will be rotated about substantially constantly changing axes through their frictional engagement with said sinuous surface on said generally annular member, as said eggs are carried by said supports, and a plurality of radially outwardly directed and radially outwardly extending nozzles extending outwardly of said axis and in the plane of eggs adapted to be supported on said supports for discharging particulate abrasive material against said eggs as the latter are rotated and moved about said axis, rotary means on said axis connected with the radially inner ends of said nozzles for delivering particulate abrasive material thereto for discharge therefrom, and means connected with said rotary means for rapidly rotating the latter and said nozzles about said axis whereby the abrasive material delivered to said nozzles will be ejected therefrom under the influence of centrifugal force.

6. An egg cleaner comprising: a circular row of supports each adapted to support an egg thereon, means connected with said supports mounting them for movement about the vertical axis of said row, each support having an upwardly and radially outwardly opening recess with a bottom inclined downwardly and outwardly relative to said axis, a generally annular member around said row, means supporting said member stationary extending across the radially outwardly opening side of the recess of each of said egg supports to prevent the egg in each recess from rolling off said bottom, an opening formed in said member at a point therearound to permit the egg in each recess to roll therethrough and off each support, egg feeding means adjacent to said opening comprising a vertically reciprocable device having an inclined egg supporting bottom slanted downwardly and toward the axis of said row, means positioning said device adjacent to said row with the lower end of its egg supporting bottom successively next to each egg support as said row thereof is moved about its axis, and with said lower end at approximately the level of the bottom of each support when said device is at the upper end of its reciprocable movement, an opening formed in said member between said egg supporting bottom of said device and said support through which an egg is adapted to roll from said egg supporting bottom onto the said bottom of said support, said egg supporting bottom on said device being substantially lower than the lower edge of said last mentioned opening when said device is at the lower end of its stroke, whereby the housing wall will hold an egg from rolling off said egg supporting platform through said last mentioned opening, means connected with said device for reciprocating the latter vertically, means within said housing for ejecting sand against the eggs in said recesses, means connected with said supports for rotating them about the axis of the row thereof.

References Cited in the file of this patent

UNITED STATES PATENTS

| | | |
|---|---|---|
| 1,596,285 | Martin | Aug. 17, 1926 |
| 1,918,653 | Martin | July 18, 1953 |